(12) United States Patent
Kirbs et al.

(10) Patent No.: US 11,761,090 B2
(45) Date of Patent: Sep. 19, 2023

(54) METHOD FOR MONITORING THE TOTAL AMOUNT OF SULPHUR CONTAINING COMPOUNDS IN A METAL PLATING BATH

(71) Applicant: Atotech Deutschland GmbH, Berlin (DE)

(72) Inventors: Andreas Kirbs, Berlin (DE); Christian Wendeln, Berlin (DE); Edith Steinhäuser, Berlin (DE); Sebastian Zarwell, Berlin (DE); Kevin-Sigurt Gottschalk, Berlin (DE); Mayumi Nishikido, Berlin (DE)

(73) Assignee: Atotech Deutschland GmbH & Co. KG, Berlin (DE)

( * ) Notice: Subject to any disclaimer, the term of this patent is extended or adjusted under 35 U.S.C. 154(b) by 803 days.

(21) Appl. No.: 15/774,299

(22) PCT Filed: Dec. 2, 2016

(86) PCT No.: PCT/EP2016/079583
§ 371 (c)(1),
(2) Date: May 8, 2018

(87) PCT Pub. No.: WO2017/093481
PCT Pub. Date: Jun. 8, 2017

(65) Prior Publication Data
US 2020/0255949 A1    Aug. 13, 2020

(30) Foreign Application Priority Data
Dec. 3, 2015  (EP) ..................... 15197684

(51) Int. Cl.
*C23C 18/40*    (2006.01)
*G01N 27/30*    (2006.01)
(Continued)

(52) U.S. Cl.
CPC ........ *C23C 18/1683* (2013.01); *C23C 18/405* (2013.01); *G01N 27/30* (2013.01); *G01N 27/49* (2013.01)

(58) Field of Classification Search
CPC ... C23C 18/1683; C23C 18/405; C23C 18/40; G01N 27/30; G01N 27/49; G01N 27/48
See application file for complete search history.

(56) References Cited

U.S. PATENT DOCUMENTS 5,112,702 A * 5/1992 Berzins ..................... C25B 5/00
                                                     429/408
6,365,033 B1   4/2002 Graham et al.
(Continued)

FOREIGN PATENT DOCUMENTS

EP    0265901       5/1988
JP    2003147540 A  5/2003
(Continued)

OTHER PUBLICATIONS

Machine Translation of Japan 2012-177658, 16 pages, first published in Japanese in 2012. (Year: 2012).*
(Continued)

*Primary Examiner* — Katherine A Bareford
(74) *Attorney, Agent, or Firm* — Renner, Otto, Boisselle & Sklar, LLP (57) ABSTRACT

The present invention relates to a method for monitoring the total amount of sulphur containing compounds in a metal or metal alloy plating bath, wherein the sulphur containing compounds contain at least one sulphur atom having an oxidation state below +6, the method comprising the steps (a), (b), optionally (c), and (d). Said method is a means of providing control over a metal plating process. Thus, the present invention relates furthermore to a controlled process for plating a metal on a substrate utilizing the method of the
(Continued)

present invention for monitoring the total amount of said sulphur containing compounds.

18 Claims, 6 Drawing Sheets

(51) Int. Cl.
 *G01N 27/49* (2006.01)
 *C23C 18/16* (2006.01)

(56) References Cited

U.S. PATENT DOCUMENTS

| | | |
|---|---|---|
| 6,709,561 B1 | 3/2004 | Pavlov et al. |
| 8,372,258 B2 | 2/2013 | Willey et al. |
| 2001/0045356 A1 | 11/2001 | Graham et al. |
| 2007/0215490 A1 | 9/2007 | Dow et al. |
| 2011/0025338 A1 | 2/2011 | Willey et al. |
| 2011/0221445 A1* | 9/2011 | Donner ............... C23C 18/1617 324/425 |

FOREIGN PATENT DOCUMENTS

| | | |
|---|---|---|
| JP | 2012177627 A | 9/2012 |
| JP | 2012177628 A | 9/2012 |
| JP | 2012177658 | 9/2012 |
| WO | 2010060906 | 6/2010 |

OTHER PUBLICATIONS

P.J. Vandeberg et al.; "Pulsed amperometric detection of sulfur compounds: thiourea at gold electrodes"; Analytica Chimica Acta, vol. 260, No. 1, May 4, 1992, pp. 1-11.
PCT/EP2016/079583; PCT International Search Report and Written Opinion of the International Searching Authority dated Feb. 10, 2017.
Office Action for Chinese Patent Application No. 201680068948.8 dated Feb. 3, 2020.
Search Report for Taiwan Patent Application No. 105139805 dated May 20, 2020.
Official Action for European Application No. 16 805 426.0 dated Apr. 9, 2020.
Translation of Official Action for Japanese Application No. 2018-528575 dated May 27, 2019.

* cited by examiner

METHOD FOR MONITORING THE TOTAL AMOUNT OF SULPHUR CONTAINING COMPOUNDS IN A METAL PLATING BATH

The present application is a U.S. National Stage Application based on and claiming benefit and priority under 35 U.S.C. § 371 of International Application No. PCT/EP2016/079583, filed 2 Dec. 2016, which in turn claims benefit of and priority to European Application No. 15197684.2 filed 3 Dec. 2015, the entirety of both of which is hereby incorporated herein by reference.

FIELD OF THE INVENTION

The present invention relates to a method for monitoring the total amount of sulphur containing compounds in a metal or metal alloy plating bath, wherein the sulphur containing compounds contain at least one sulphur atom having an oxidation state below +6, the method comprising the steps (a), (b), optionally (c), and (d). Said method is a means of providing control over a metal deposition process. Thus, the present invention relates furthermore to a controlled process for depositing a metal on a substrate utilizing the method of the present invention for monitoring the total amount of said sulphur containing compounds.

BACKGROUND OF THE INVENTION

In metal plating processes plating and bath properties are usually controlled and regulated by means of additives in the plating bath, including for example sulphur containing compounds (the terms "deposition", "depositing" and "plating" are used interchangeably throughout the text). Such regulatory function of sulphur containing compounds in a respective metal plating bath is utilized in electroless and electrolytical metal plating processes. Typically, such regulatory sulphur containing compounds contain at least one sulphur atom having a comparatively low oxidation state (at least below +6) and, thus, are distinct from compounds containing only sulphur atoms having an oxidation state of 6 (e.g. sulphate ions).

A metal plating bath, in particular a copper plating bath designed for electroless copper plating, typically contains sulphur containing compounds (e.g. compounds containing a sulfhydryl group). Such compounds usually operate as stabilizers (also known as sulphur containing stabilizers or sulphur containing stabilizer additives; throughout the present text only "stabilizers"), thus, enhancing the bath lifetime, controlling the deposition rate of the respective metal and improving the quality of the deposited metal. Typically, a mixture of such stabilizers is used in a metal plating bath in order to reach the desired stability, deposition rate and quality. Stabilizers are usually employed at low concentrations, typically in a total amount of 1 to 100 ppm. In a considerably higher concentration such stabilizers tend to block the substrates in the plating bath due to deposition on the substrate's surface. As a result, the optimal concentration of said stabilizers in a respective plating bath needs to be carefully balanced.

The total amount of said stabilizers varies throughout the metal plating process, in particular the total amount decreases due to (i) incorporation of said stabilizers into the metal deposit and (ii) degradation processes. Thus, the optimal replenishment rate of said stabilizers is the key to a successful metal plating process, in particular in electroless metal (e.g. copper) plating processes. However, a reliable monitoring and preferably determination of the total amount of said stabilizers in a respective metal plating bath is complex and still a challenging task for the following reasons:

- the concentration of said compounds is very low and thus not accessible for common analytical tools,
- rapid changes in the chemistry of an operating metal plating process may occur, and
- the total amount of sulphur containing compounds with at least one sulphur atom having a comparatively low oxidation state needs to be monitored in some cases independently from sulphur containing compounds with only sulphur atoms having an oxidation state of 6 (e.g. sulphate ions).

In WO 2010/060906 A1 a method for control of stabilizer additives in electroless metal and metal alloy plating electrolytes is disclosed. The stabilizers typically comprise organic and inorganic sulphur compounds, organic nitrogen compounds and optionally cyanide ions. The method disclosed in WO'906 comprises the step of measuring a Faradaic current while a potential scan is carried out. However, a monitoring of specifically sulphur containing compounds, wherein the sulphur containing compounds contain at least one sulphur atom having an oxidation state below +6 is not disclosed in WO'906.

In EP 0 265 901 A2 a control of electroless plating baths is disclosed. EP'901 refers to "a method for analyzing and controlling an electroless plating bath solution [ . . . ], said method allowing analysis and control of the bath constituents without taking samples, directly within the working solution and without time delay".

According to page 3, lines 54 to 58 it reads: "The invention provides for a real time control of an electroless plating bath solution, in particular, an electroless copper plating bath solution wherein the main constituents are copper sulfate, complexing agent, formaldehyde, a hydroxide and a stabilizer." Typical stabilizers are vanadium and cyanide agents. However, EP'901 is silent with respect to monitoring the total amount of sulphur containing compounds containing at least one sulphur atom having an oxidation state below +6.

In JP 2012 177658 A a control method and system of sulfur-based compound is disclosed in order to provide a method and a system which easily and accurately measures and controls a concentration of sulfur compounds in an electroless nickel plating solution. As a result, there is still an ongoing demand for a reliable method which allows monitoring and/or determining the total amount of said stabilizers in a respective sample/metal plating bath.

Furthermore, there is a need for a better controlled plating process in order to maintain a basically constant concentration range or concentration level of said stabilizers in a respective metal plating bath while the plating process is carried out.

Objective of the Present Invention

It was the first objective of the present invention to provide a reliable method for monitoring the total amount of said stabilizers (containing at least one sulphur atom having an oxidation state below +6). Such a method should provide reliable results even in the presence of other sulphur containing compounds with only sulphur atoms having an oxidation state of 6 (e.g. sulphate ions).

It was the second objective to provide a better controlled or more controlled metal deposition process.

In addition, said methods should be simple, time and cost efficient and highly reproducible. Furthermore, the method for monitoring the total amount of said stabilizers should be suitable for real time analysis and real time control.

SUMMARY OF THE INVENTION

The first objective is solved by means of a method for monitoring the total amount of sulphur containing compounds in a metal or metal alloy plating bath, wherein the sulphur containing compounds contain at least one sulphur atom having an oxidation state below +6, the method comprising the steps:
(a) providing a measuring sample comprising
    one or more than one of said sulphur containing compound and
    one or more than one reducing agent,
(b) in a measuring unit comprising a working electrode, the electrode being contacted with the measuring sample
    applying a constant potential to the electrode such that the reducing agent is anodically oxidized at the electrode in the presence of the one or more than one said sulphur containing compounds, thereby generating an anodic oxidation current, and
    simultaneously measuring the anodic oxidation current to obtain current data,
(c) optionally processing the current data of the measured anodic oxidation current obtained in step (b) to obtain processed current data,
(d) comparing the current data obtained in step (b) or the processed current data obtained in step (c) with
    data or processed data, respectively, of at least one reference anodic oxidation current obtained from a reference sample comprising a reference total amount of said sulphur containing compounds.

The second objective is solved by means of a controlled process for depositing a metal on a substrate, the controlled process comprising the steps:
(A) providing the substrate and a metal plating bath, wherein the metal plating bath comprises metal ions of the metal to be deposited and sulphur containing compounds, wherein the sulphur containing compounds contain at least one sulphur atom having an oxidation state below +6
(B) depositing the metal onto the substrate,
(C) while depositing, monitoring and/or determining the total amount of said sulphur containing compounds in the metal plating bath utilizing the method for monitoring as described above (preferably as described below in the text as being preferred),
(D) controlling the process for depositing based on the monitoring and/or determination obtained in step (C).

DESCRIPTION OF THE FIGURES

In each plot ((a) to (f)) current data of a measured anodic oxidation current are depicted as measured in step b) of the method for monitoring according to the present invention.

In plots (a) and (f) a measuring sample was measured not containing any sulphur containing compounds with at least one sulphur atom having an oxidation state below +6 (0%).

In plots (b) to (e) measuring samples were measured containing different amounts (reference amounts) of sulphur containing compounds with at least one sulphur atom having an oxidation state below +6. Plot (e) refers to a measuring sample containing a maximum reference amount (100%; set point), wherein plot (b) refers to a measuring sample containing a reference amount of 25%, plot (c) 50%, and plot (d) 75%, respectively.

FIG. 1, plots (a) to (e) show that the current I after 500 seconds is lower the higher the amount of sulphur containing compounds with at least one sulphur atom having an oxidation state below +6 in the respective measuring sample is.

FIG. 2 clearly shows an inversely proportional correlation (linear regression line) between current and concentration.

DETAILED DESCRIPTION OF THE INVENTION

Throughout the present text below, the term "method for monitoring" refers to the method for monitoring the total amount of sulphur containing compounds in a metal or metal alloy plating bath, wherein the sulphur containing compounds contain at least one sulphur atom having an oxidation state below +6 (the method as described above and furthermore described in detail below in the text). The term "controlled process for depositing" refers to the controlled process for depositing a metal on a substrate (the process as described above and furthermore described in detail below in the text).

Furthermore, if the term "metal plating bath" or "plating bath" (or a respective term) is used said terms also refer to a metal alloy (i.e. such terms include the alternative of a metal alloy plating bath).

In step (b) of the method for monitoring a constant potential is applied to the working electrode such that the reducing agent is anodically oxidized at the electrode in the presence of the one or more than one said sulphur containing compound. This means that in step (b) of the method for monitoring the one or more than one sulphur containing compound is not anodically oxidized at the working electrode. The oxidation of the reducing agent results in an anodic oxidation current which is measured in step (b). In other words, the anodic oxidation current generated in step (b) of the method for monitoring is the anodic oxidation current of the reducing agent, preferably of formaldehyde (compare Examples below).

Our own experiments have surprisingly shown that the anodic oxidation current measured in step (b) correlates with the total amount of said sulphur containing compounds. Processed data obtained from said measured currents show within a comparatively wide range a linear correlation. This correlation can be advantageously utilized for monitoring the total amount of said sulphur containing compounds. Furthermore, said experiments have also shown that the method for monitoring of the present invention and the controlled process for plating of the present invention show even excellent results if the metal plating bath is enriched with by-products such as formic acid, methanol and carbonate, which are typical in an aged metal plating bath containing formaldehyde.

Without wishing to be bound by theory, it is assumed that sulphur containing compounds containing at least one sulphur atom having an oxidation state below +6 exhibit a high affinity to the working electrode's surface. As a result, said compounds "poison" the surface of the working electrode by forming a deposit on the surface and thereby blocking the electrode's surface to a certain extend. If a constant potential (which is specifically selected for the reducing agent, the working electrode material and the used reference electrode) is applied and the anodic oxidation current is measured a decay (i.e. a decrease) of the anodic oxidation current (additionally to a natural current decay) is observed over time (see FIG. 1). Our experiments have shown that the current decay correlates with the total amount of said sulphur containing compounds in a respective measuring sample. As a consequence, the total amount of said compounds can reliably monitored and can be even determined.

Figure 1:
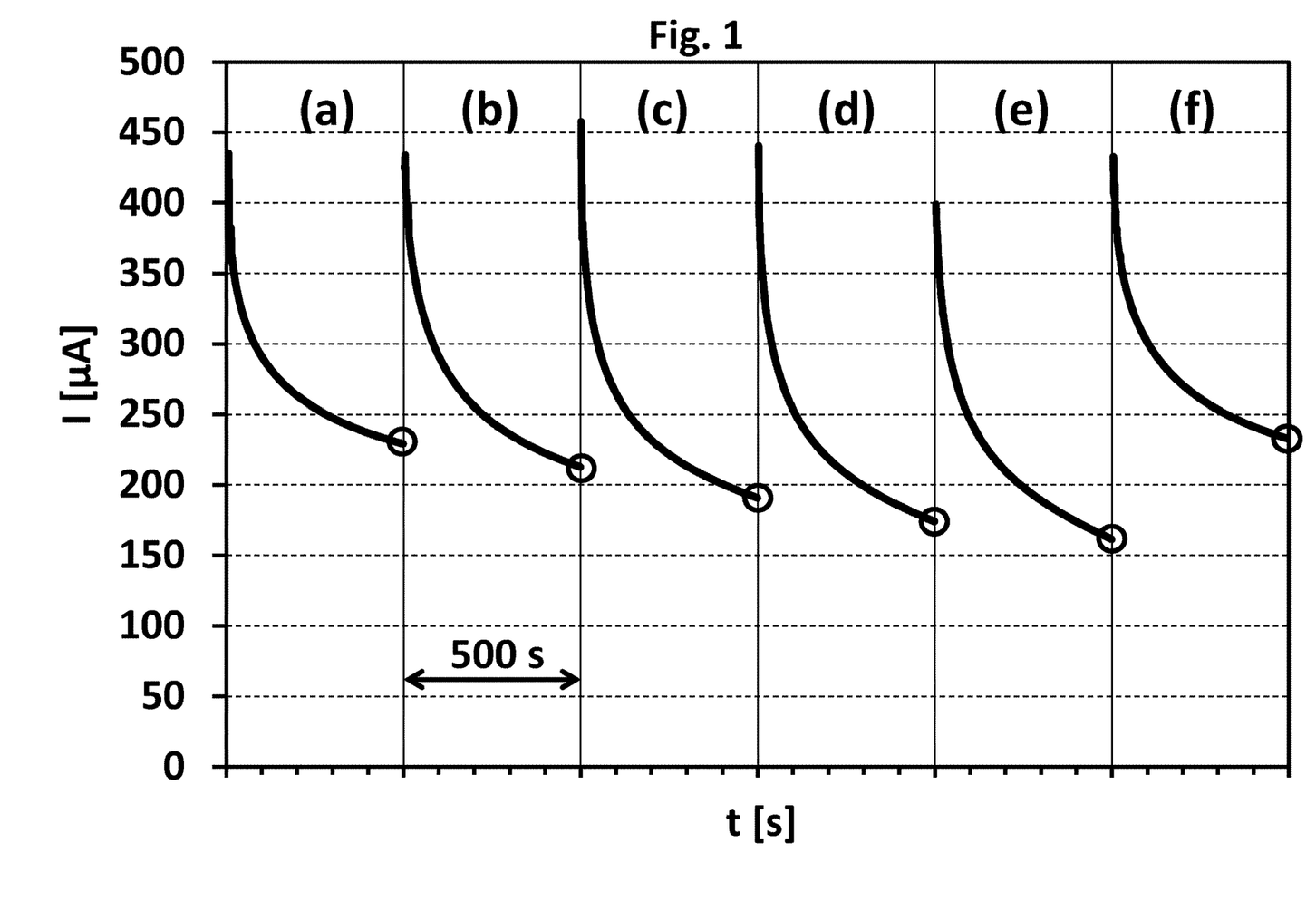
FIG. 1 shows six current vs. time plots ((a) to (f)) included in one Figure, referring to the data obtained in Example 1 (copper plating bath). The y-axis shows the current I in microampere, the x-axis six time slots of 500 seconds each.

The method for monitoring of the present invention is based on an indirect approach (method for indirectly monitoring the total amount of said sulphur containing compounds in a metal or metal alloy plating bath) because in step (b) the anodic oxidation current of the reducing agent is measured and not the oxidation current of the sulphur containing compound(s). This means that even in the absence of any sulphur containing compound (a compound as defined throughout the present text) an oxidation current will be measured, which is a maximum oxidation current (see FIGS. 1(a) and (f)). In contrast, if the amount of sulphur containing compounds increases, the oxidation current decreases due to increased working electrode surface poisoning.

The method for monitoring according to the present invention, based on an indirect approach, exhibits some advantages compared to a direct approach, such as (i) a significantly increased sensitivity and (ii) higher flexibility.

Sensitivity is significantly increased because the concentration of a reducing agent in a respective measuring sample is much higher (typically in the g/L range) than the concentration of said sulphur containing compounds (typically in the ppb or lower ppm range). As a result, oxidizing the reducing agent, which is present in a significantly higher concentration, results in a much higher oxidation current. An indirect method is therefore more robust.

Furthermore, flexibility is higher. First, in the method for monitoring the monitoring can be carried out even if the sulphur containing compound containing at least one sulphur atom having an oxidation state below +6 is hardly or not at all oxidisable at the working electrode under reasonable conditions.

Second, the constant potential applied in step (b) to generate the anodic oxidation current can be very accurately adjusted to a specific reducing agent. Thus, the constant potential is largely independent of the one or more than one sulphur containing compound. For example, a reducing agent can be oxidized (for example if a mixture of reducing agents is used) which does not interfere with said sulphur containing compound(s). According to step (a) of the method for monitoring according to the present invention a measuring sample is provided. The measuring sample is the sample, wherein step (b) is carried out.

In some cases a method for monitoring according to the invention (as described above) is preferred, wherein the measuring sample is identical to the metal plating bath (i.e. the composition of the measuring sample is identical to the composition of the metal plating bath). In such a case, either a sample of the metal plating bath is separated and transferred to a measuring unit (the separated sample becomes the measuring sample defined in step (a)) or the entire metal plating bath is the measuring sample, wherein the respective compartment filled with the metal plating bath becomes the measuring unit according to step (b).

In other cases a method for monitoring (as described above, preferably as described as being preferred) is preferred, additionally comprising prior to step (a) the following step:

(a0) mixing a sample of the metal plating bath containing said one or more than one sulphur containing compound with a modifier such that the measuring sample results (as defined in step (a)).

Thus, step (a0) is an optional step and can be considered as a sample preparation step, leading to the measuring sample. Preferably, steps (a0) and (a) are carried out in the measuring unit, more preferably steps (a0) and (a) are carried out in the measuring unit and step (b) is carried out simultaneously (for more details see the text below). In some other cases it is preferred that step (b) starts only a few seconds after steps (a0) and (a) are carried out in the measuring unit, preferably after 30 seconds or less, more preferably after 10 seconds or less, even more preferably after 5 seconds or less.

The term "mixing [ . . . ] with a modifier" means mixing the sample of the metal plating bath with (i) a single compound, (ii) a mixture of compounds, (iii) a series of single compounds, (iv) a series of mixtures of compounds, or (v) a series of one or more than one single compound and one or more than one mixtures of compounds, wherein the "modifier" is the single compound, the mixture of compounds, the series of single compounds, the series of mixtures of compounds and the series of one or more than one single compound and one or more than one mixtures of compounds, respectively.

Preferably, the measuring sample defined in step (a) is a diluted metal plating bath sample. Surprisingly, a dilution has no negative impact on the method of monitoring according to the present invention although the total amount of said stabilizers in a respective metal plating bath is already very low and in said diluted sample even lower. However, the method for monitoring according to the present invention is very sensitive.

In many cases a method for monitoring (as described above, preferably as described as being preferred) is preferred, wherein 50 Vol.-% or less of the measuring sample is the metal or metal alloy plating bath, based on the total volume of the measuring sample, preferably 35 Vol.-% or less, more preferably 25 Vol.-% or less, most preferably 11 Vol.-% or less. Preferably, at least 5 Vol.-% of the measuring sample is the metal or metal alloy plating bath.

In many cases, oxidation currents as measured in step (b) are sensitive to the majority of ingredients in a metal plating bath, e.g. to said sulphur containing compounds, metal ions (e.g. copper ions), complexing agents, inorganic additives, and organic additives other than said sulphur containing compounds. Among the latter, the oxidation current in particular depends on the reducing agent and its total amount in the measuring sample. It has been shown in many of our own experiments that (i) a 1:10 dilution of a metal plating bath sample (i.e. that 10 Vol.-% of the measuring sample are the metal or metal alloy plating bath) eliminates undesired effects caused by ingredients other than the reducing agent. However, since the amount of reducing agent in the measuring sample is reduced too (if the metal plating bath contains already a reducing agent) addition of a reducing agent is preferred. If the metal plating bath contains a reducing agent and the measuring sample is a diluted metal plating bath sample, a method for monitoring according to the present invention (as described above, preferably as described as being preferred) is preferred, wherein the total concentration (mol/L) of reducing agents in the measuring sample is at least 90% of the total concentration of reducing agents in the metal plating bath, preferably at least 95%, more preferably at least 97%, most preferably at least 100%. In some cases the concentration of reducing agent in the measuring sample might be even higher compared to the concentration of reducing agents in the metal plating bath. The total concentration of reducing agent in a series of measuring samples should be basically identical throughout all measurements.

Most preferred is a method for monitoring according to the invention (as described above, preferably as described as being preferred), wherein the added reducing agent is formaldehyde. This is even preferred when the reducing agent in the metal plating bath is unknown. If the measuring sample contains only a small fraction of such a metal plating bath, e.g. 10 Vol.-% (and likewise only a very small fraction of the reducing agent used in the metal plating bath), the method for monitoring according to the present invention is preferably carried out on the basis of formaldehyde. However, it is preferred that the reducing agent in the metal plating bath is known and preferably a known amount of the same reducing agent is added in order to obtain the measuring sample, more preferably the reducing agent is formaldehyde.

The anodic oxidation current measured in step (b) is influenced by the applied constant potential and the material of the working electrode. Preferably, the applied potential and the working electrode used in step (b) are suitably selected for the reducing agent, preferably for formaldehyde. The optimal potential for different working electrode materials, preferably for gold and platinum, and different reducing agents, preferably formaldehyde, can be determined in a series of test experiments.

If a metal plating bath does not contain any reducing agent, one of the compounds (modifier) mixed with a respective sample of the metal plating bath is a reducing agent, preferably formaldehyde. In such a case, the total amount of sulphur containing compounds containing at least one sulphur atom having an oxidation state below +6 is monitored although the respective metal plating bath does originally not contain a reducing agent. The optimal amount of reducing agent (preferably of formaldehyde) can be determined by carrying out a series of test measurements with simple test samples each comprising a different amount of the reducing agent.

A method for monitoring according to the invention (as described above, preferably as described as being preferred) is preferred, wherein a total amount of reducing agent in the measuring sample is selected such that the measured anodic oxidation current obtained in step (b) is at least 1 mA/cm$^2$, preferably at least 2 mA/cm$^2$, more preferably at least 3 mA/cm$^2$. Thus, preferred is a method for monitoring according to the present invention (as described above, preferably as described as being preferred), wherein the total amount of reducing agent in the measuring sample is in the range of from 16 mmol/L to 400 mmol/L, preferably in the range of from 64 mmol/L to 283 mmol/L, more preferably in the range of from 96 mmol/L to 200 mmol/L, based on the total volume of the measuring sample.

Preferably, the total amount of formaldehyde (as a preferred reducing agent) in the measuring sample is in the range of from 0.5 g/L to 12 g/L, preferably in the range of from 2.0 g/L to 8.5 g/L, more preferably in the range of from 3.0 g/L to 6.0 g/L, based on the total volume of the measuring sample. Preferably, no additional reducing agent is present.

A method for monitoring according to the present invention (as described above, preferably as described as being preferred) is preferred, wherein the one or more than one reducing agent is selected from the group consisting of compounds comprising at least one aldehyde group, phosphorus-containing reducing agents with an oxidizable phosphorus atom, and nitrogen-containing reducing agents with an oxidizable nitrogen atom, preferably the one or more than one reducing agent comprises one or more than one compound selected from the group consisting of formaldehyde, glyoxylic acid, glyoxylate, hypophosphite, dimethylamine borane, borohydride, and hydrazine, more preferably the one reducing agent is formaldehyde or the more than one reducing agents comprises at least formaldehyde. In some cases it is preferred that the one or more than one reducing agent is selected from the group consisting of compounds comprising at least one aldehyde group, more preferably compounds with only one aldehyde group. Preferably, the measuring sample comprises one reducing agent, preferably as defined above.

Our own experiments have shown that a measuring sample obtained after (i) dilution and (ii) addition of a reducing agent (preferably formaldehyde) provides excellent results and consequently an excellent monitoring with very good reproducibility and reliability. Surprisingly, the method for monitoring of the present invention (as described above, preferably as described as being preferred) is on the one hand sensitive enough to reliably measure anodic oxidation currents in a measuring sample, wherein even 11 Vol.-% or less of the measuring sample is the metal plating bath (high degree of dilution) and on the other hand reliably monitors a total amount of said sulphur containing compounds much below 1 ppm, based on the total weight of the measuring sample. Preferred is a method for monitoring according to the present invention (as described above, preferably as described as being preferred), wherein the total amount of sulphur containing compounds containing at least one sulphur atom having an oxidation state below +6 in the measuring sample is 2.0 ppm or less, based on the total weight of the measuring sample, preferably 0.5 ppm or less, more preferably 0.2 ppm or less, most preferably in the range of from 0.01 ppm to 0.001 ppm (1 ppb). Other preferred ranges are 2.0 ppm to 0.001 ppm, 1.0 ppm to 0.001 ppm, 0.5 ppm to 0.001 ppm, and 0.2 ppm to 0.001 ppm.

As mentioned above, in optional step (a0) a modifier is mixed with a sample of a metal plating bath.

Preferably, the modifier does not comprise sulphur containing compounds containing at least one sulphur atom having an oxidation state below +6 (or having another oxidation state as described below in the text as being preferred), preferably the modifier does not comprise sulphur containing compounds at all. If the modifier comprises sulphur containing compounds containing at least one sulphur atom having an oxidation state below +6 (or having another oxidation state as described below in the text as being preferred) the total amount of these sulphur containing compounds is preferably known. In each case, after mixing with the modifier the measuring sample of step (a) results. For example, a sample of a metal plating bath (comprising an unknown total amount of said sulphur containing compounds) is mixed with a modifier, wherein the modifier comprises a known total reference amount of said sulphur containing compounds. The resulting measuring sample contains an unknown total amount of said sulphur containing compounds. However, if the reference amount is known the total amount of said sulphur containing compounds can be monitored and even determined by e.g. comparison with a reference sample comprising the known total reference amount of said sulphur containing compounds (step d).

A method for monitoring according to the present invention (as described above, preferably as described as being preferred) is preferred, wherein the modifier comprises one or more than one compound selected from the group consisting of reducing agents, solvents, metal ions, pH-modifiers such as acids or bases, complexing agents, and further additives (not being reducing agents, solvents, metal ions, pH-modifiers and complexing agents). Preferably, the modifier comprises a first mixture and a reducing agent, wherein the composition of said first mixture is identical to the metal plating bath with the exception that no reducing agent and no sulphur containing compounds containing sulphur atoms having an oxidation state below +6 are contained. Such a first mixture is often referred to as "basic metal plating bath" or "make up solution". The first mixture typically contains water as a solvent, metal ions (e.g. copper ions), complexing agents (e.g. tartrate), and further additives (e.g. surfactants).

Preferably, the metal plating bath is a copper plating bath, preferably a copper plating bath without alloying metal ions. Thus, a method for monitoring according to the present invention (as described above, preferably as described as being preferred) is preferred, wherein the measuring sample comprises copper ions, preferably copper ions in a concentration in the range of from 0.005 mol/L to 1 mol/L, preferably in the range of from 0.01 mol/L to 0.35 mol/L or from 0.36 mol/L to 0.9 mol/L, based on the total volume of the measuring sample. Preferably, the total amount of copper ions in the measuring sample is higher than the total amount of alloying metal ions, more preferably the measuring sample does not contain alloying metal ions. The reducing agent is preferably formaldehyde.

In some cases it is preferred that the metal plating bath is a nickel plating bath, preferably a nickel plating bath without alloying metal ions. Thus, in this case a method for monitoring according to the present invention (as described above, preferably as described as being preferred) is preferred, wherein the measuring sample comprises nickel ions, preferably nickel ions in a concentration in the range of from 0.005 mol/L to 1 mol/L, preferably in the range of from 0.01 mol/L to 0.35 mol/L, more preferably in the range of from 0.01 mol/L to 0.2 mol/L, based on the total volume of the measuring sample. Preferably, the total amount of nickel ions in the measuring sample is higher than the total amount of alloying metal ions, more preferably the measuring sample does not contain alloying metal ions. The reducing agent in a respective measuring sample comprising nickel ions is preferably formaldehyde.

As already mentioned above, sulphur containing compounds containing at least one sulphur atom having an oxidation state below +6 tend to "poison" the surface of the working electrode (for further details see the text above). It is believed that this effect can be advantageously utilized in the method for monitoring according to the present invention. Thus, preferred is a method for monitoring according to the present invention (as described above, preferably as described as being preferred), wherein the one or more than one sulphur containing compound contains at least one sulphur atom having an oxidation state equal to or below +4, preferably at least one sulphur atom having an oxidation state in the range of from −2 to +2 (i.e. minus 2 to plus 2), more preferably the one or more than one sulphur containing compound comprises one, two or more than two compounds selected from the group consisting of thiosulfate, thiocyanate, dithiothreitol, 2-mercaptoethanol, 3-mercapto-1-propanol, 1-mercapto-2-propanol, 2,2'-thiodiethanol, 3,3'-thiodipropanol, thiourea, N, N'-diethylthiourea, 2-mercaptobenzothiazole, 2-methyl-2-thiazoline, 2-(methylthio)-2-thiazoline, 2-mercapto-2-tiazoline, 5-amino-1,3,4-thiadiazol-2-thiol, 2-(hydroxymethyl)benzothiazole, thiabendazole, 2-mercaptophenol, 4-mercaptophenol, bis-(sulfopropyl)-disulfide, 3-mercaptopropanesulphonate, 4-(methylthio)aniline, 2-mercaptobenzimidazole, 2-(methylthio)benzimidazole, 1-methyl-1H-benzoimidazole-2-thiol, D-biotin, 2-(methylthio)ethylamine, cysteamine, cystamine dihydrochloride, N-acetylcysteine, 2-(methylthio)benzoic acid, 4,4'-thiodiphenol, 4-phenylthiazole-2-thiol, 5-thio-D-glucose, 3,6-dithia-1,8-octanediol, thioacetic acid, thioglycolic acid, 2-(methylthio)-1-ethanol, 3-(methylthio)-1-propanol, and thiosalicylic acid, furthermore preferably thiosulfate, thiocyanate, dithiothreitol, 2-mercaptoethanol, 3-mercapto-1-propanol, 1-mercapto-2-propanol, 2,2'-thiodiethanol, 3,3'-thiodipropanol, thiourea, N,N'-diethylthiourea, 2-mercaptobenzothiazole, 2-(hydroxymethyl)benzothiazole, thiabendazole, 2-mercaptophenol, 4-mercaptophenol, bis-(sulfopropyl)-disulfide, 3-mercaptopropanesulphonate, 4-(methylthio)aniline, 2-mercaptobenzimidazole, 2-(methylthio)benzimidazole, 1-methyl-1H-benzoimidazole-2-thiol, D-biotin, 2-(methylthio)ethylamine, cysteamine, cystamine dihydrochloride, N-acetylcysteine, 2-(methylthio)benzoic acid, 4,4'-thiodiphenol, 4-phenylthiazole-2-thiol, 5-thio-D-glucose, 3,6-dithia-1,8-octanediol, thioacetic acid, thioglycolic acid, 2-(methylthio)-1-ethanol, 3-(methylthio)-1-propanol, and thiosalicylic acid. Even more preferably, the one or more than one sulphur containing compound is selected from the group consisting of thiosulfate, thiocyanate, dithiothreitol, 2-mercaptoethanol, 3-mercapto-1-propanol, 1-mercapto-2-propanol, 2,2'-thiodiethanol, 3,3'-thiodipropanol, thiourea, N, N'-diethylthiourea, 2-mercaptobenzothiazole, 2-(hydroxymethyl)benzothiazole, thiabendazole, 2-mercaptophenol, 4-mercaptophenol, bis-(sulfopropyl)-disulfide, 3-mercaptopropanesulphonate, 4-(methylthio)aniline, 2-mercaptobenzimidazole, 2-(methylthio)benzimidazole, 1-methyl-1H-benzoimidazole-2-thiol, D-biotin, 2-(methylthio)ethylamine, cysteamine, cystamine dihydrochloride, N-acetylcysteine, 2-(methylthio)

benzoic acid, 4,4'-thiodiphenol, 4-phenylthiazole-2-thiol, 5-thio-D-glucose, 3,6-dithia-1,8-octanediol, thioacetic acid, thioglycolic acid, 2-(methylthio)-1-ethanol, 3-(methylthio)-1-propanol, and thiosalicylic acid.

As described in the text above, the method for monitoring of the present invention can be applied for a metal plating bath with or without a reducing agent. Typically, a metal plating bath for electroless metal plating contains a reducing agent, in many cases formaldehyde. Such a plating bath typically has a basic pH (e.g. a pH above 12). A method for monitoring according to the present invention (as described above, preferably as described as being preferred) is preferred, wherein the pH of the measuring sample at 20° C. is 9 or above, preferably 10 or above, more preferably 12 or above. In some cases it is preferred that the above mentioned modifier comprises a pH modifier such that a pH in the measuring sample is obtained as defined above. Such a measuring sample is an alkaline measuring sample.

The method for monitoring according to the present invention utilizes an anodic oxidation current which is measured at a working electrode (step (b)). A method for monitoring according to the invention (as described above, preferably as described as being preferred) is preferred, wherein the working electrode is selected from the group consisting of gold working electrode, platinum working electrode, copper working electrode, boron-doped diamond working electrode, and glassy carbon working electrode, preferably the working electrode is selected from the group consisting of gold working electrode, platinum working electrode, and copper working electrode, more preferably the working electrode is selected from the group consisting of gold working electrode and platinum working electrode, most preferably the working electrode is a gold working electrode. In some cases it is preferred that the working electrode utilized in step (b) does not comprise a copper working electrode or a silver working electrode. In particular if the pH is alkaline, a copper working electrode forms in many cases an undesired oxide layer.

Differently shaped working electrodes can be used for the method of monitoring of the present invention including plate shaped electrodes, rings, ribbons, discs and wires.

In some cases it is preferred that the working electrode contains a support material and a working electrode material (e.g. gold, platinum, etc.). The support material is preferably non-conductive, more preferably selected from the group consisting of plastic and glass. The working electrode material is preferably coated or laminated onto the support material. It has been shown that working electrodes containing a cost efficient support material coated or laminated with e.g. gold are economically and ecologically very efficient.

Without wishing to be bound by theory, it is believed that gold exhibits the highest affinity to said sulphur containing compounds. As a result, even very small amounts of said compounds significantly "poison" the surface of a respective working electrode (for further details see the text above), showing the best sensitivity compared to other working electrode materials. Thus, such a working electrode is very suitable for monitoring very low amounts of said sulphur containing compounds. However, the method for monitoring according to the present invention can be carried out also with working electrode materials other than gold (see above in the text).

Our own experiments have shown that in many cases the anodic oxidation of the reducing agent usually results in the formation of gases (e.g. hydrogen, carbon monoxide, carbon dioxide), which very often adsorb as gas bubbles on the surface of the working electrode. Such gas bubbles negatively affect the measurement of the anodic oxidation current by additionally blocking (or "poisoning") the electrode's surface. Thus, it is preferred that the measuring sample is stirred at least during step (b) in order to detach or remove said bubbles. As a result, a method for monitoring according to the present invention (as described above, preferably as described as being preferred) is preferred, wherein
  the working electrode is rotating while measuring the anodic oxidation current in step (b) and/or
  the measuring sample is stirred by means of a separate stirrer.

Preferably, the rotation speed of the working electrode and the stirrer, respectively, is independently in the range of from 500 to 5000 rpm, preferably in the range of from 1500 to 4000 rpm, more preferably in the range of from 2000 to 3000 rpm. More preferably, the rotation speed is constant while measuring the anodic oxidation current in step (b).

Working electrodes used in the method for monitoring according to the present invention are preferably reused after a cleaning step, more preferably at least for a number of measurements. Such a cleaning step is essential in order to remove and desorb any deposit (e.g. oxides, sulphides, organic residues, grease, oils, and fingerprints) from the surface of the working electrode prior to a measurement according to step (b). Thus, preferred is a method for monitoring according to the present invention (as described above, preferably as described as being preferred) additionally comprising prior to step (b) the following step:
  cleaning the working electrode in a solution comprising one or more than one inorganic acid or one or more than one base, wherein the cleaning is preferably an electrochemical cleaning.

The above mentioned cleaning step always includes a chemical cleaning (effect of e.g. chemical etching by means of the inorganic acid or base). Preferably, the solution comprises sulfuric acid (preferably in a concentration of 0.2 to 1.0 M) or sodium hydroxide (preferably in a concentration of 0.04 to 0.4 M). However, preferably the chemical cleaning is combined with an electrochemical cleaning. In such a cleaning step the chemical cleaning is supplemented by electrolytic oxidation and reduction processes on the surface of the working electrode in order to oxidize and/or reduce any compounds deposited on the electrode's surface. It is believed that removal and desorption of said deposited compounds is improved upon oxidation and/or reduction. Our own experiments have shown in many cases that an electrochemical cleaning in an acidic solution (e.g. a 0.5 M $H_2SO_4$ containing cleaning solution) provides an optimal cleaning process. As a result, unnecessary costs for new working electrodes can be avoided. Typically, the electrochemical cleaning is monitored by voltammetry, preferably by cyclic voltammetry. Suitable conditions for voltammetry are for example: cyclic voltammetry, 100 mV/s.

Usually, the cleaning is easy, reliable, and quickly accomplished because the adsorbed deposit is only moderately attached to the surface of the electrode after a measurement, in particular if the working electrode is a gold working electrode. This is different if said sulphur containing compounds are directly oxidized at the working electrode. In this case strongly attached deposits are formed on the surface of the working electrode, even on the surface of a gold working electrode, deposits typically requiring a more intense and time-consuming cleaning.

According to step (b) of the method for monitoring according to the present invention, a constant potential is applied and an anodic oxidation current is measured (the anodic oxidation current of the reducing agent). In some cases the constant potential, versus $Hg/HgSO_4$, is preferably selected from the range of from −2.0 to 1 V, preferably from the range of from −1.0 to 0.0 V. Our own experiments have shown that such a constant potential provides optimal results in oxidizing the reducing agent, in particular if the reducing agent is formaldehyde and the working electrode material is gold. The skilled person knows that the constant potential needs to be specifically set for the respective reducing agent, working electrode material, and sample composition in order to obtain an optimal oxidation current of the reducing agent. Thus, the constant potential needs to be adapted if the reducing agent is not formaldehyde and the working electrode material is not gold. Furthermore, the constant potential is selected such that (i) no metal ions (which are typically present in a respective measuring sample; e.g. copper ions) are deposited onto the surface of the working electrode and (ii) no sulphur containing compounds are anodically oxidized at the working electrode.

During step (b) no potential scan (i.e. a potential starting from an initial potential, which is constantly increased or decreased over time until a final potential is reached) is carried out. The potential applied and maintained during step (b) (in each step (b) if the method for monitoring is carried out more than one time) is a fixed, i.e. a constant, potential. The potential can vary in the sense that different constant potentials can be applied in each step (b), e.g. depending on the reducing agent and working electrode material in use.

The anodic oxidation current measured in step (b) of the method according to the present invention (as described above, preferably as described as being preferred) is preferably in the range of from 1 $mA/cm^2$ to 300 $mA/cm^2$, preferably is in the range of from 1 $mA/cm^2$ to 100 $mA/cm^2$, more preferably is in the range of from 3 $mA/cm^2$ to 50 $mA/cm^2$. As mentioned above, the anodic oxidation current measured in step (b) is the oxidation current of the reducing agent, preferably of formaldehyde. This means that the oxidation current is basically free of other oxidation currents and obtained from the reducing agent only.

In order to reliably monitor the total amount of said sulphur containing compounds in a metal plating bath step (b) needs to be carried out for at least some time. In order to obtain more reliable results a minimum time is required. Thus, a method for monitoring according to the present invention (as described above, preferably as described as being preferred) is preferred, wherein step (b) is carried out for at least 100 seconds, preferably for at least 300 seconds, more preferably for at least 450 seconds. Our own experiments have shown that such a minimum time is preferred because at the very beginning of step (b) the anodic oxidation process is not stable enough to obtain reliable data. It has been shown in a number of experiments that e.g. after at least 100 seconds data are obtained which can be used for linear fitting. Our own experiments have shown that the quality of data is increased if step (b) is carried out longer than 100 seconds. As shown above, it is assumed that the "poisoning" caused by said sulphur containing compounds additionally (to the naturally occurring current decay) decays (decreases) the anodic oxidation current. Hence, this additional decaying is more reliably measured and more significant if step (b) is carried out for a reasonable long time.

On the other hand, it is reasonable to limit the duration of step (b) (measuring time) of the method for monitoring according to the present invention. Although step (b) can theoretically be carried out for hours, relevant and reliable data are usually obtained within a few minutes. If step (b) is carried out too long the method for monitoring is unsuitable for monitoring the total amount of said sulphur containing compounds while the plating bath is in use because not enough measuring points are available and, thus, changes in the bath composition may go unnoticed. In such a case the method for monitoring would insufficiently meet practical requirements. Thus, a method for monitoring according to the present invention (as described above, preferably as described as being preferred) is preferred, wherein step (b) is carried out for up to 6 hours, preferably for up to 1 hour, more preferably for up to 30 minutes, even more preferably for up to 1000 seconds, more preferably for up to 800 seconds, more preferably for up to 500 seconds.

In a most preferred method for monitoring, step (b) is carried out for at least 300 seconds and for up to 800 seconds, preferably for at least 450 seconds and for up to 800 seconds, more preferably step (b) is carried out for at least 450 seconds and for up to 500 seconds.

In the method for monitoring according to the present invention (as described above, preferably as described as being preferred) the steps (a) and (b) are preferably combined. In such a case the measuring sample is formed or provided in the measuring unit by mixing a modifier with a sample of the metal plating bath while the constant potential is already applied. The anodic oxidation current is immediately generated and can be immediately measured in order to obtain current data. For example, in a first step a portion of a "make up" solution (see above) is placed in the measuring unit. In a second step the sample of the metal plating bath and the reducing agent are simultaneously added and mixed to the portion of the "make up" solution; the measuring sample results. During the adding and mixing the constant potential is already applied and, thus, an anodic oxidation current can be instantaneously measured.

Preferably, step (b) is carried out at a temperature (measurement temperature) in the range of from 5° C. to 40° C., more preferably at a temperature in the range of from 15° C. to 35° C., most preferably at a temperature in the range of from 15° C. to 25° C. If the method for monitoring according to the present invention is carried out repeatedly, the measurement temperature is preferably kept constant within a deviation delta of +/−5° C., more preferably +/−2° C., even more preferably +/−1° C., around the selected measurement temperature in order to provide a reliable reproducibility.

Step (b) of the method for monitoring of the present invention is carried out in a measuring unit comprising at least a working electrode. Preferably, the measuring unit comprises a three electrode set-up including a working electrode, a reference electrode and a counter electrode. Preferably, the reference electrode is a common commercially available reference electrode, preferably selected from the group consisting of Ag/AgCl silver chloride reference electrode, $Hg/Hg_2Cl_2$ calomel reference electrode and $Hg/Hg_2SO_4$ mercury sulphate reference electrode. The counter electrode is preferably an inert electrode, preferably a noble metal electrode, more preferably a platinum electrode, typically separated from the measuring sample by a diaphragm (e.g. a platinum electrode in a salt bridge filled with sulphuric acid or sodium hydroxide solution).

Step (c) of the method for monitoring is an optional processing step. After step (b) a set of current "raw" data is obtained (e.g. a correlation of anodic oxidation currents vs. time points). In the simplest case, the total amount of said sulphur containing compounds in a metal plating bath can be already monitored based on current raw data derived from two measuring samples. For example, current raw data from a measuring sample A1 and A2 are obtained in step (b), wherein measuring sample A2 is a reference sample. According to step (d), the obtained current raw data of measuring sample A1 can be simply compared with the current raw data of measuring sample A2. Measuring sample A2 is identical with measuring sample A1 with the only exception that measuring sample A2 corresponds to the conditions in a respective plating bath before the plating process was started, and, thus, contains the appropriate total amount of said sulphur containing compounds (target amount or set point). Based on the comparison, said sulphur containing compounds are e.g. added and the monitoring is repeated in order to verify the addition. In such a way an empirical control of a respective metal plating process is possible. In such a way the total amount of said sulphur containing compounds can be monitored, without necessarily knowing the exact total concentration of these compounds. For a reliable comparison the total amount of reducing agent, preferably of formaldehyde, in the measuring sample and in the reference sample(s) need(s) to be basically identical.

In another case the current data obtained in step (b) are processed in step (c). As mentioned above, the obtained current data obtained in step (b) is for example a correlation of anodic oxidation currents (I) vs. time points (t). The processing includes for example that a charge (Q) can be determined, which can be used for comparison in step (d). The charge Q is an example of processed current data according to step (c) of the present invention.

In step (d) of a preferred method for monitoring according to the present invention (as described above, preferably as described as being preferred) the current data obtained in step (b) or the processed current data obtained in step (c) are compared with two, three, four, five or more than five reference anodic oxidation currents obtained from two, three, four, five or more than five, respectively, reference samples each comprising a reference total amount of said sulphur containing compounds.

In some cases preferably both current data and processed current data are used for comparison in step (d) of the present invention.

On the basis of at least two reference samples containing a known total amount of said sulphur containing compounds, not only the total amount of said compounds in a metal plating bath can be monitored but rather the total amount of said compounds in said metal plating bath can be even determined. In such a way it is possible to determine the concentration of said compounds in the metal plating bath.

Thus, preferred is a method for monitoring according to the present invention (as described above, preferably as described as being preferred) additionally comprising after step (d) the following step:
(e) based on the comparison in step (d), determining the total amount of said sulphur containing compounds in the measuring sample.

In order to determine the total amount of said compounds in a measuring sample reference samples are used. Reference samples contain known total amounts of said sulphur containing compounds. In order to determine the total amount of said compounds in the measuring sample, the raw data obtained for each (of at least two) reference sample are processed. A preferred processing step is a conversion into a plot showing time specific anodic oxidation currents vs. corresponding known relative concentrations of said sulphur containing compounds (reference plot, see FIG. 2). Our own experiments have shown that this correlation is most widely linear. The total amount of said sulphur containing compounds in the measuring sample can be easily determined by comparing the time specific anodic oxidation current of a measuring sample with the reference plot.

Most preferred is a method for monitoring the total amount of sulphur containing compounds in a metal or metal alloy plating bath, wherein the sulphur containing compounds contain at least one sulphur atom having an oxidation state in the range of from −2 to +2, the method comprising the steps:
(a) providing a measuring sample comprising
one or more than one of said sulphur containing compounds,
optionally copper ions or nickel ions and
formaldehyde,
(b) in a measuring unit comprising a working electrode selected from the group consisting of gold working electrode and platinum working electrode, preferably with a gold working electrode, the electrode being contacted with the measuring sample
applying a constant potential to the electrode such that formaldehyde is anodically oxidized at the electrode in the presence of the one or more than one said sulphur containing compounds, thereby generating an anodic oxidation current, and
simultaneously measuring the anodic oxidation current to obtain current data,
(c) optionally processing the current data of the measured anodic oxidation current obtained in step (b) to obtain processed current data,
(d) comparing the current data obtained in step (b) or the processed current data obtained in step (c) with
data or processed data, respectively, of at least one reference anodic oxidation current obtained from a reference sample comprising formaldehyde and a reference total amount of said sulphur containing compounds
and preferably
(e) determining the total amount of said sulphur containing compounds in the measuring sample.

The method for monitoring according to the present invention usually allows an online monitoring of a plating process and thus a real time control (see the controlled process for depositing in the text below).

The result obtained after step (d) or (e) can be used in order to better control the respective metal plating process. Thus, the present invention refers also to a controlled process for depositing a metal on a substrate, the controlled process comprising the steps:
(A) providing the substrate and a metal plating bath (preferably a metal plating bath as described above in the text, preferably as described as being preferred), wherein the metal plating bath comprises metal ions of the metal to be deposited and sulphur containing compounds, wherein the sulphur containing compounds contain at least one sulphur atom having an oxidation state below +6,
(B) depositing the metal onto the substrate,
(C) while depositing, monitoring and/or determining the total amount of said sulphur containing compounds in the metal plating bath utilizing the method for monitoring according to the present invention (as described above, preferably as described as being preferred),
(D) controlling the process for depositing based on the monitoring and/or determination obtained in step (C).

The above-mentioned regarding the method for monitoring according to the present invention preferably applies also to the controlled process for depositing of the present invention. Furthermore, the controlled process also applies to metal alloys and a respective metal alloy plating bath.

Preferred is a controlled process according to the present invention (as described above), wherein step (B) is an electrolytic depositing or an electroless depositing, preferably an electroless depositing. Electroless depositing preferably comprises autocatalytic processes. However, the controlled process for depositing is basically suitable for any kind of electroless depositing.

The monitoring and/or determining according to step (C) can reveal that the total amount of said sulphur containing compounds in the metal plating bath is either too low or too high. Typically, the total amount is too low because said compounds (stabilizers) are usually incorporated into the deposited metal layer or degraded by oxidation processes during the deposition process. As a result, the total amount of said compounds continually decreases in the metal plating bath. Usually, stabilizers are replenished after certain time intervals. However, in absence of an exact monitoring the replenishment can result in an overdosage of stabilizers. As a result, the total amount of said compounds in the metal plating bath is too high. Such an overdosage is unfavorable and usually results in a significantly decreased deposition rate or even completely prevents the deposition of the metal. In many cases the overdosage is compensated by diluting the metal plating bath, extracting or at least decreasing the total amount of organic additives by means of charcoal or consuming the additives by plating on dummy substrates ("dummy plating"). However, in each unfavorable case the depositing process is delayed and additional costs are generated.

Thus, a controlled process is preferred (as described above, preferably as described as being preferred) wherein step (D) comprises the step:

(D1) increasing the concentration of said sulphur containing compounds in the metal plating bath, preferably by adding said sulphur containing compounds to the metal plating bath, or (D2) decreasing the concentration of said sulphur containing compounds in the metal plating bath, preferably as described above.

As a result, the method for monitoring according to the present invention and the controlled process for depositing according to the present invention allows optimizing metal plating processes economically and ecologically. Thus, the present invention relates to the use of the method for monitoring according to the present invention (as described above, preferably as described as being preferred) for controlling a metal depositing process (preferably as described as above) in a metal plating bath comprising sulphur containing compounds containing at least one sulphur atom having an oxidation state below +6.

The above-mentioned regarding (i) the method for monitoring according to the present invention and (ii) the controlled process for depositing preferably applies to the above-mentioned use.

The present invention is illustrated by the following non limiting examples.

EXAMPLES

Example 1 (According to the Invention)

Figure 2:
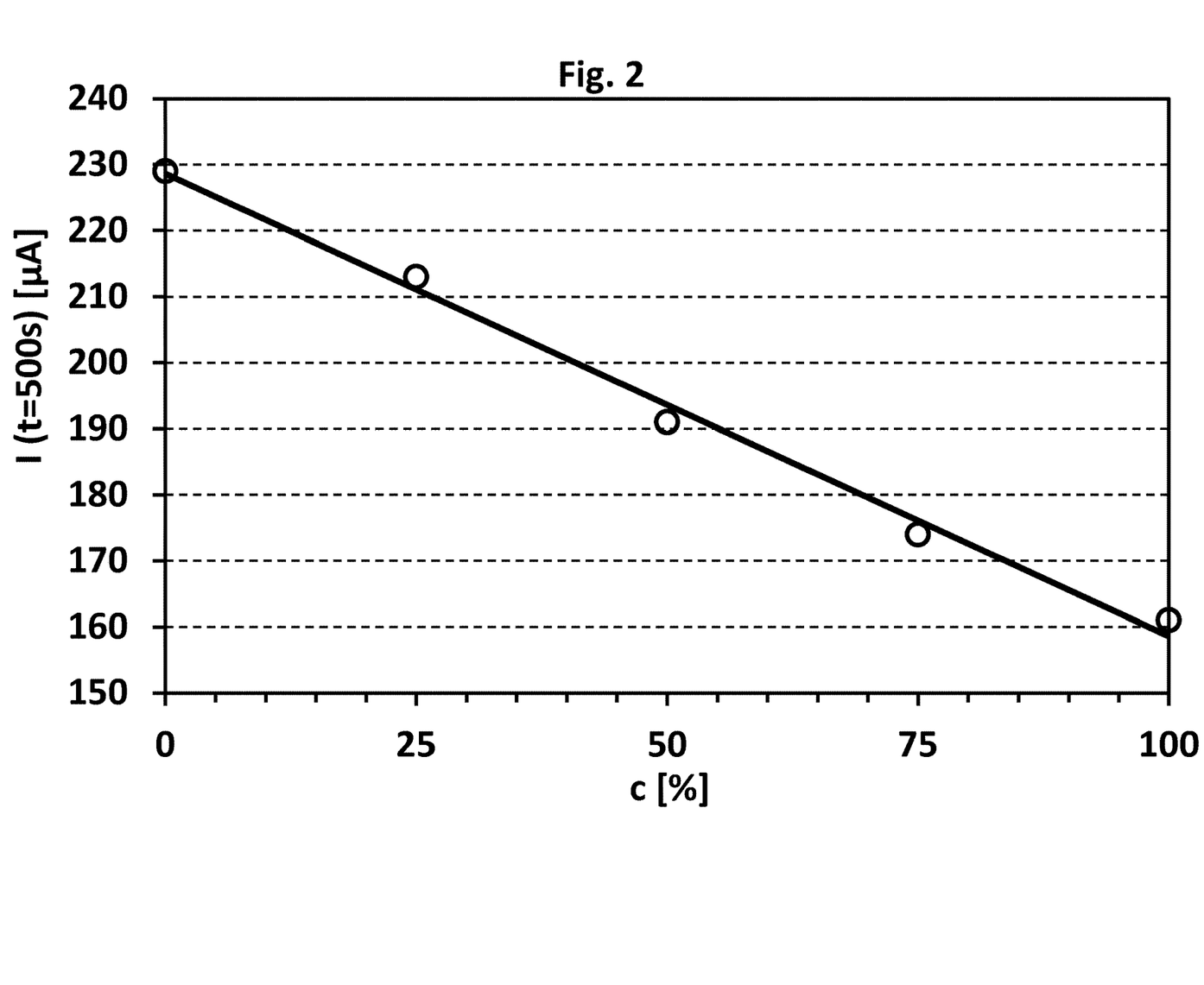
FIG. 2 shows a current vs. concentration (relative concentration of said stabilizers) plot and refers to the current data obtained in Example 1 (depicted in FIG. 1). The y-axis shows the current values in microampere obtained after 500 seconds (see FIG. 1) for each plot (a) to (e), the x-axis shows the relative concentration in percent of sulphur containing compounds with at least one sulphur atom having an oxidation state below +6 (referred to the above mentioned maximum reference amount, set point).

FIGS. 1 and 2 refer to Example 1.

Step (a), Providing a Measuring Sample:

According to step (a) of the method for monitoring according to the invention six measuring samples were prepared (measuring samples "a" to "f", samples "a" and "f" were identical).

In a first step four freshly prepared pre-metal plating bath samples (PB-1 to PB-4) were provided, each containing an individual reference amount of said sulphur containing compounds. The sulphur containing compound(s) used in the present example contain(s) at least one sulphur atom having an oxidation state in the range of from −2 to +2. PB-1 to PB-4 were prepared by mixing "make up" solution and the individual reference amount of stabilizer (said sulphur containing compounds). The "make up" solution contains water, copper sulphate (total concentration of copper ions in a range of from 0.01 mol/L to 0.35 mol/L), a complexing agent (tartrate), sodium hydroxide and further additives (dipyridyl, surfactants and PEG). The stabilizer was added in different amounts to the "make up" solution in order to obtain PB-1 to PB-4, wherein the total stabilizer concentration increased from PB-1 to PB-4 (PB-4 maximum relative concentration of 100%, set point; PB1 25%; PB-2 50%; Pb-3 75%). The "make up" solution does not contain any sulphur containing compound containing at least one sulphur atom having an oxidation state below +6.

The six measuring samples were obtained as follows:

For measuring samples "a" and "f" only "make up" solution was mixed with formaldehyde (measuring samples "a" and "f" are identical). Measuring samples "b" to "e", were obtained by mixing PB-1 to PB-4, respectively, "make up" solution and formaldehyde (for further details see Table 1 below). Less than 25 Vol.-% of measuring samples "b" to "e" is pre-metal plating bath. The pH of each measuring sample was above 12 (measured at 20° C.).

TABLE 1

| ingredient | measuring sample | | | | | |
|---|---|---|---|---|---|---|
| | a | b | c | d | e | f |
| PB-1 [ml] | — | 2 | — | — | — | — |
| PB-2 [ml] | — | — | 2 | — | — | — |
| PB-3 [ml] | — | — | — | 2 | — | — |
| PB-4 [ml] | — | — | — | — | 2 | — |
| "make up" [ml] | 10 | 8 | 8 | 8 | 8 | 10 |
| formaldehyde [g/L]* | 4.8 | 4.8 | 4.8 | 4.8 | 4.8 | 4.8 |
| c [%]** | 0 | 25 | 50 | 75 | 100 | 0 |
| c [ppm]# | 0 | 0.01 ppm to 0.001 ppm | | | | 0 |

*formaldehyde was added such that a concentration of 4.8 g/L resulted in each measuring sample
**relative total concentration of sulphur containing compounds containing at least one sulphur atom having an oxidation state below +6 in percent
total amount of sulphur containing compounds containing at least one sulphur atom having an oxidation state below +6 in ppm (based on the total weight of the measuring sample)

Step (b), Measuring the Anodic Oxidation Current in a Measuring Unit:

The measuring unit was equipped with a gold working electrode (Gold-Rotating Disc Electrode, d=2 mm), a reference electrode (Hg/Hg$_2$SO$_4$/K$_2$SO$_4$) and a counter electrode (Pt rod d=1 mm, length 50 mm, in 0.5 M H$_2$SO$_4$, separated by a ceramic diaphragm).

Prior to measuring the anodic oxidation current (prior to step (b)) the measuring unit (as described above and comprising the working electrode) was electrochemically cleaned by cyclic voltammetry (−0.9 V to +1.6 V versus reference electrode, 3 scans, rotation speed 2000 rpm) in 0.5 M $H_2SO_{04}$. Afterwards the unit was rinsed with high purity water.

During measurement of the anodic oxidation current (during step (b)) the gold working electrode was rotating with a rotation speed of 1000 rpm. The constant potential applied during step (b) was −0.55 V (versus reference electrode). The anodic oxidation current (current density) was in the range of from 3 $mA/cm^2$ to 50 $mA/cm^2$.

The anodic oxidation current of formaldehyde in each measuring sample was measured for 500 seconds and respective current data were obtained.

The obtained current data are shown in FIG. 1, wherein measuring sample "a" refers to FIG. 1(*a*), "b" to FIG. 1(*b*), "c" to FIG. 1(*c*), "d" to FIG. 1(*d*), "e" to FIG. 1(*e*), and "f" to FIG. 1(*f*), respectively.

FIG. 1(*a*) to 1 (f) show that the measured oxidation current at zero seconds was in the range of from approximately 400 μA to 460 μA. Variations at the beginning of electrochemical measurements are typical and not surprising. However, after a comparatively short measuring time (e.g. 50 to 100 seconds) the current data obtained were independent of the initial (varying) current values. After e.g. 500 seconds very reliable current data were obtained (irrespective of the oxidation current values measured in the first few seconds).

Step (c), Processing Current Data Obtained in Step (b):

For each measured measuring sample the specific current obtained after 500 seconds was plotted into a current vs. concentration (stabilizer concentration) plot (see FIG. 2).

Step (d), Comparing Current Data:

Measuring sample "e" (referring to PB-4) represents a metal plating bath sample containing the target total amount of said sulphur containing compounds present in a metal plating bath (100%) before the plating process is started (freshly prepared metal plating bath).

Current data as obtained for measuring sample (e) (see FIG. 1(*e*)) can be compared with current data obtained from measuring samples corresponding to metal plating bath samples with reduced total amounts of said sulphur containing compounds (e.g. 25%, 50%, and 75%, see FIG. 2). On the basis of such a comparison the total amount of said sulphur containing compounds in a respective metal plating bath can be monitored and a respective metal plating process can be furthermore better controlled (see Example 2).

Figure 4:
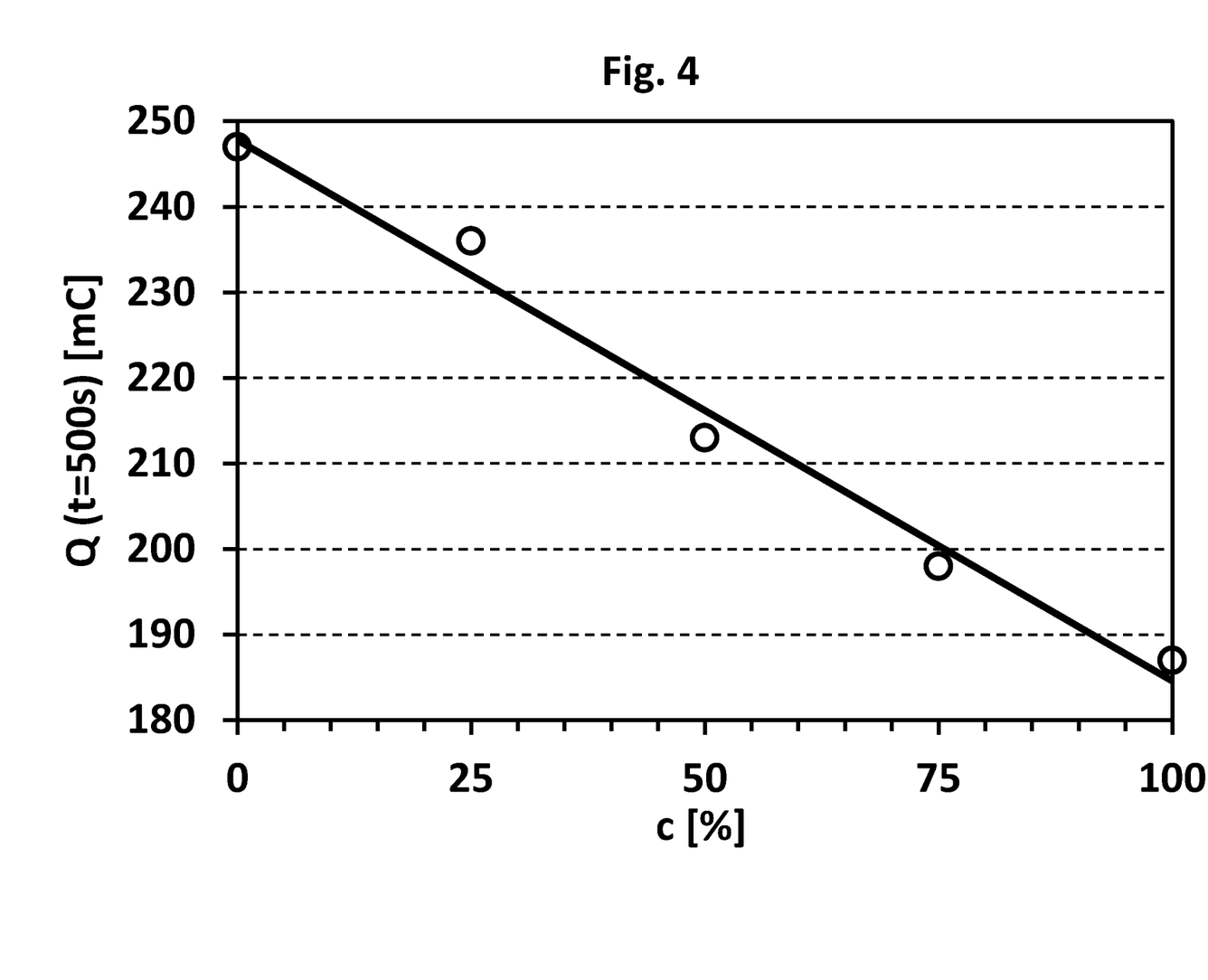
FIG. 4 shows a charge (Q) vs. concentration (relative concentration of said stabilizers) plot based on FIG. 2. The y-axis shows charge values in millicoulomb obtained after 500 seconds (compare FIG. 1 and FIG. 2).

FIG. 4 shows a charge (Q) vs. concentration (relative concentration of said stabilizers) plot based on FIG. 2. The y-axis shows charge values in millicoulomb obtained after 500 seconds (compare FIG. 1 and FIG. 2).

Example 2 (According to the Invention)

In a first step five reference samples were prepared similar to Example 1 (0%, 25%, 50%, 75%, and 100%) and respective reference anodic oxidation currents were obtained (in particular oxidation current values after 500 seconds measuring time).

In a second step a test metal plating bath (copper) was prepared for a test metal plating process, the test metal plating process carried out for several hours. The test metal plating bath contained a starting total amount of said sulphur containing compounds (100%, identical to 100% in the respective reference sample; said sulphur containing compounds being identical to the compounds used in Example 1).

During the test metal depositing process 18 metal plating bath samples (Nr. 0 to 17) were taken at various times. The obtained samples were analogously modified as described in Example 1. As a result, 18 measuring samples were obtained. In each measuring sample the anodic oxidation current was measured as described in Example 1 to obtain current data (and in particular oxidation current values after 500 seconds measuring time, i.e. step (b) was carried out for at least 500 seconds). The obtained current data were compared to the reference anodic oxidation currents obtained in the first step (in particular compared to the reference oxidation current values obtained after 500 seconds measuring time) in order to determine the total amount of said sulphur containing compounds in each measuring sample. After measuring samples No. 2, 4, 6, 10, 12, and 14 have been measured, replenishing amounts of said sulphur containing compounds were added to the test metal plating bath based on the determination, in order to better control the test metal depositing process. The added volume in ml of a stock solution containing said sulphur containing compounds per litre test metal plating bath is shown in FIG. 3 (numbers in boxes) and ranges from 0.45 ml/L to 0.85 ml/L.

Figure 3:
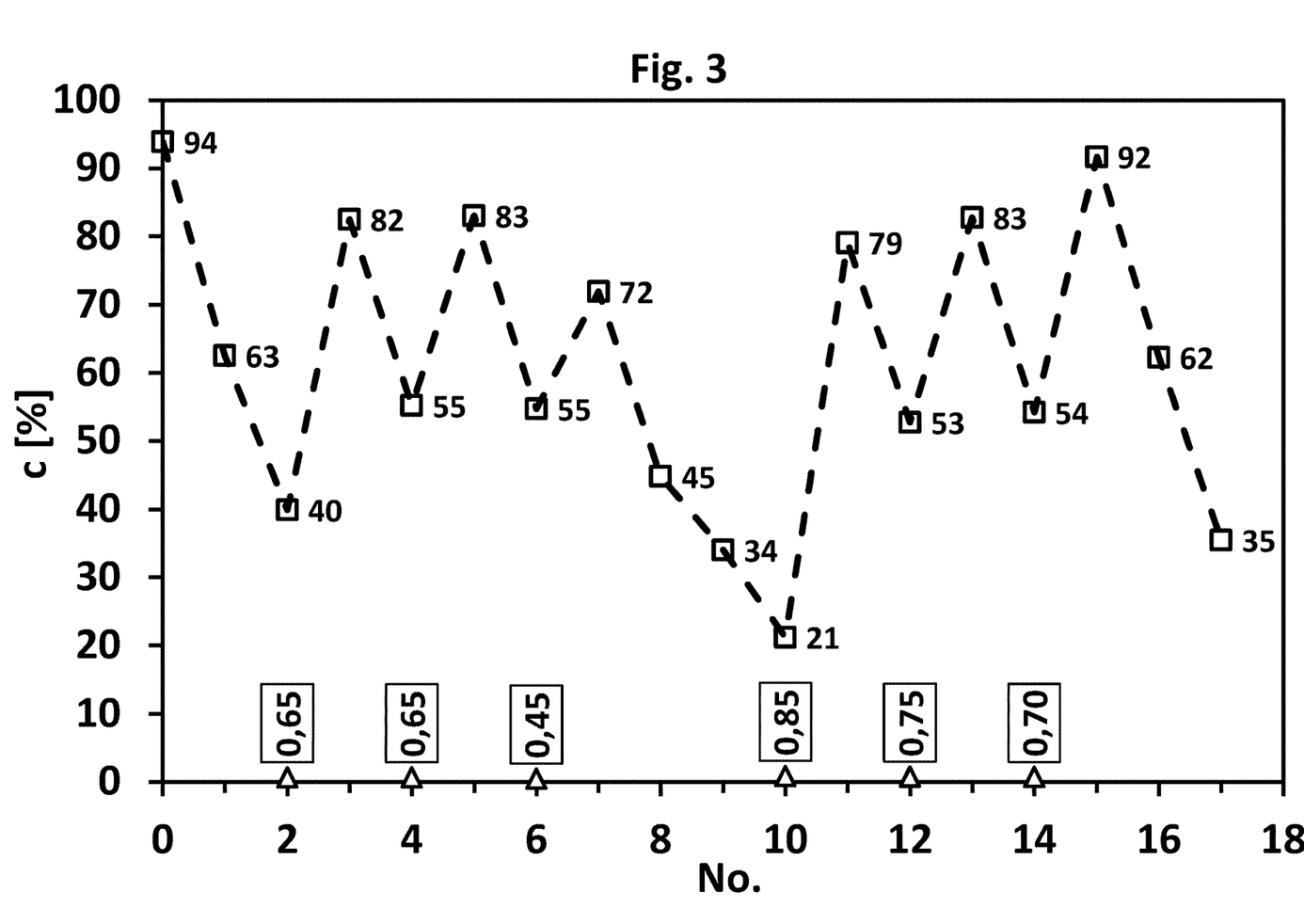
FIG. 3 shows a concentration (concentration of said stabilizers) vs. measuring sample number plot and refers to Example 2. In Example 2 a test metal plating bath (copper) was in use over several hours and 18 samples were taken in order to monitor the total amount of said sulphur containing compounds (for further details see Example 2 below in the text).

As shown in FIG. 3, the total amount of said compounds can be adjusted to desired levels. As a result, the test metal depositing process can be efficiently controlled during the metal depositing process.

Example 3 (According to the Invention)

Example 3 was similarly prepared to Example 1; however each measuring sample contained an identical nickel ion concentration in the range of from 0.01 mol/L 15 to 0.2 mol/L instead of copper ions.

Eleven samples (samples 0 to 10) were prepared, wherein sample 0 contained no sulphur containing compounds containing at least one sulphur atom having an oxidation state below +6 (0% stabilizer). Samples 1 to 10 contained different amounts of a sulphur containing compound containing at least one sulphur atom having an oxidation state in the range of from −2 to +2. The relative concentration of said sulphur containing compound in sample 1 was 10% compared to sample 10 comprising a relative concentration of 100% (set point). In samples 2 to 9 the relative concentration was increased stepwise by 10%.

In order to prepare the samples, in each case 0.5 ml of a freshly prepared plating bath sample for example containing water, nickel ions, a complexing agent, further compounds, and said sulphur containing compound in varying amounts from 0% to 100% were mixed with 19.5 ml of a 0.5 M NaOH solution. The reducing agent in each sample was formaldehyde, which was added such that in each sample a formaldehyde concentration of approximately 4.8 g/L resulted. As a result, each plating bath sample was diluted by a factor of approximately 40 prior to measurement. The pH in each obtained sample was above 12.

In step (b), a gold working electrode with a rotation speed of 2000 rpm was used. The applied constant potential was +0.1 V versus reference electrode ($Ag/AgCl_3$/3M KCl) (potentiostatic chronoamperometry). In each sample, the anodic oxidation current of formaldehyde was measured for 200 seconds.

The working electrode was electrochemically cleaned by cyclic voltammetry (−0.5 V to +1.8 V in steps of 100 mV/s versus $Ag/AgCl_3$/3M KCl) in 0.5 M $H_2SO_4$ after each measurement.

Figure 5:
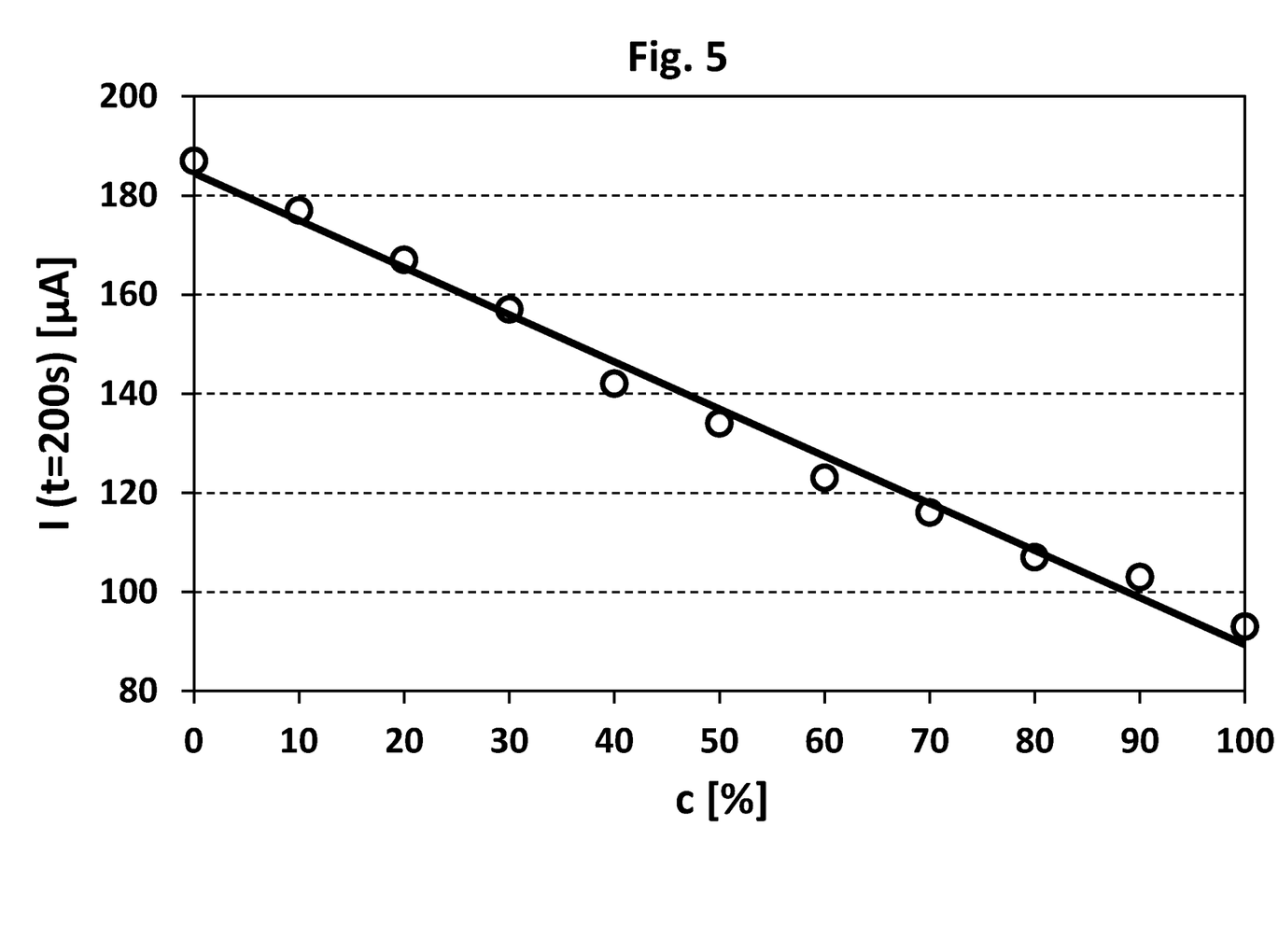
FIG. 5 shows a current vs. concentration (relative concentration of said stabilizers) plot and refers to the current data obtained in Example 3 (nickel plating bath). Similar to Example 1 and FIG. 2, the y-axis shows current values in microampere each obtained after 200 seconds; the x-axis shows the relative concentration in percent of sulphur containing compounds with at least one sulphur atom having an oxidation state below +6 (likewise referring to a maximum reference amount of 100%, set point).
Figure 6:
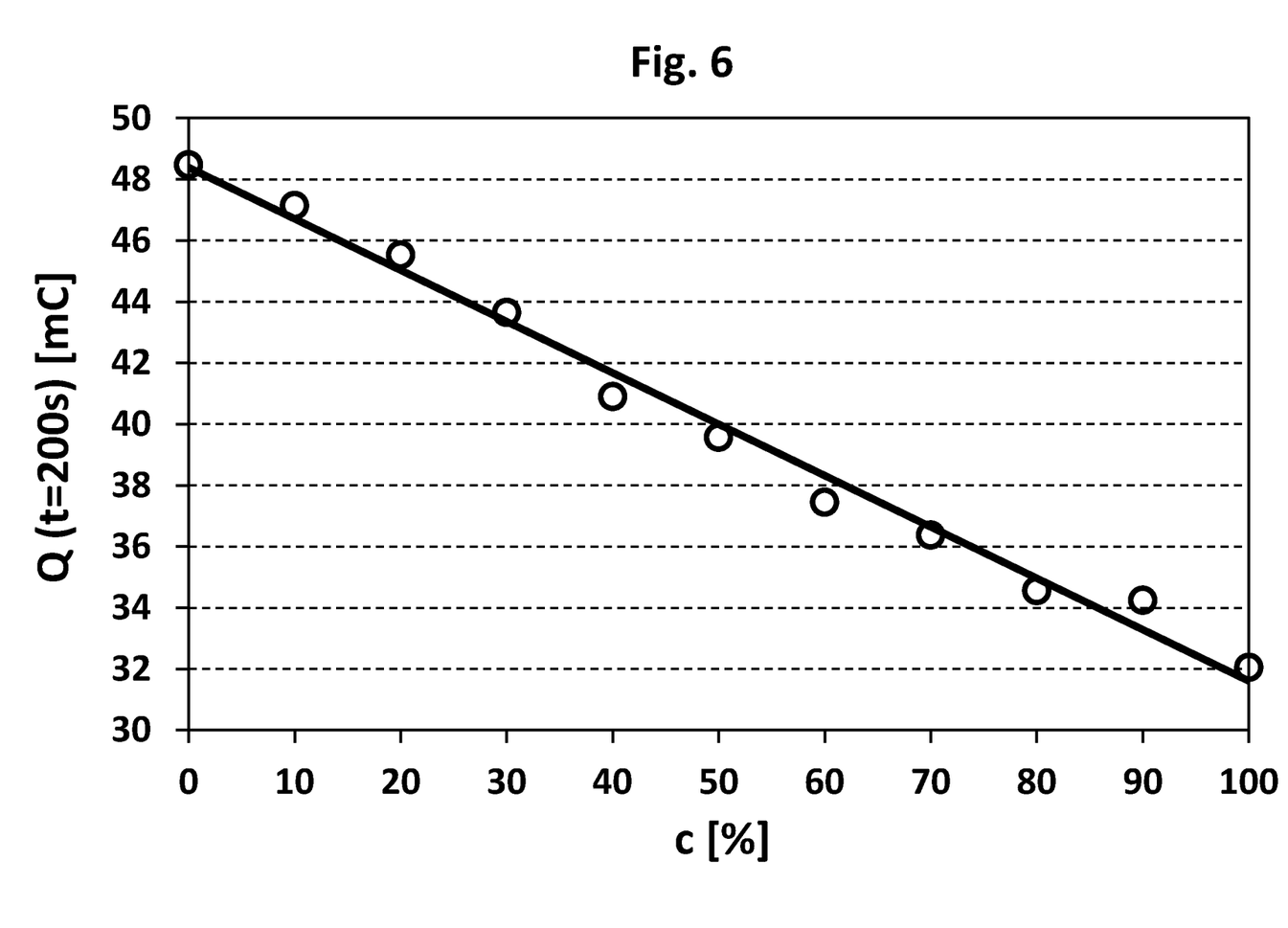
FIG. 6 shows a charge (Q) vs. concentration (relative concentration of said stabilizers) plot based on Example 3 and FIG. 5. The y-axis shows charge values in millicoulomb obtained after 200 seconds.

Similar to Example 1, a linear correlation of total amount of said sulphur containing compound to current (see FIG. 5)

and to charge (see FIG. 6) was observed, which can be used for monitoring said compounds in a nickel plating bath. Thus, the method for monitoring of the present invention is also beneficial for nickel plating baths.

The invention claimed is:

1. A method for monitoring and adjusting total amount of sulphur containing compounds having at least one sulphur atom having an oxidation state below +6 in a metal or metal alloy plating bath,
wherein the metal or metal alloy plating bath comprises one or more than one of said sulphur containing compounds and one or more than one reducing agent,
the method comprising the steps:
(a) obtaining from the metal or metal alloy plating bath a sample, and adding to the sample a known amount of an additional reducing agent to obtain a measuring sample, and, optionally diluting the sample prior to adding the additional reducing agent;
(b) bringing the measuring sample obtained in step (a) into contact with a working electrode in a measuring unit and applying a constant potential to the working electrode such that both the one or more reducing agent and the additional reducing agent are anodically oxidized at the working electrode in the presence of the one or more than one said sulphur containing compounds to generate an anodic oxidation current, and simultaneously measuring the anodic oxidation current decaying over time to obtain current data of current values during the decaying;
(c) optionally processing the current data of the measured anodic oxidation current obtained in step (b) to obtain processed current data,
(d) determining a total amount of said sulphur containing compounds in said metal or metal alloy plating bath by comparing the current data obtained in step (b) or the processed current data obtained in step (c) with data or processed data, respectively, in a reference plot showing time specific anodic oxidation currents vs. corresponding known relative concentrations of said sulphur containing compounds in reference samples comprising reference total amounts of the sulphur containing compounds and an identical known amount of the reducing agents in the sample obtained in step (a),
(e) based on the comparing in step (d), determining the total amount of said sulphur containing compounds in the measuring sample, and
based on step (e), adjusting the total amount of said sulphur containing compounds in said metal or metal alloy plating bath to a desired level,
wherein the anodic oxidation current decays in correlation with the total amount of said sulphur containing compounds both in the measuring sample and in the reference samples, and the anodic oxidation current of both the one or more reducing agent and the additional reducing agent are measured and not the oxidation current of said sulphur containing compounds.

2. The method of claim 1, wherein the sample obtained in step (a) is diluted such that total volume of the measuring sample contains no more than 50 Vol. % of the metal or metal alloy plating bath, based on the total volume of the measuring sample.

3. The method of claim 1, wherein a total amount of reducing agent ii added to the measuring sample in step (a) is selected such that the measured anodic oxidation current obtained in step (b) is at least 3 mA/cm$^2$.

4. The method of claim 1, wherein the one or more than one reducing agent is selected from the group consisting of compounds comprising at least one aldehyde group, phosphorus-containing reducing agents with an oxidizable phosphorus atom, and nitrogen-containing reducing agents with an oxidizable nitrogen atom.

5. The method of claim 4 wherein the one or more reducing agent comprises formaldehyde.

6. The method of claim 1, wherein the total amount of sulphur containing compounds containing at least one sulphur atom having an oxidation state below +6 in the measuring sample is 2.0 ppm or less, based on the total weight of the measuring sample.

7. The method of claim 1, wherein the one or more than one sulphur containing compound contains at least one sulphur atom having an oxidation state equal to or below +4.

8. The method of claim 7, wherein the one or more than one sulphur containing compound contains at least one sulphur atom having an oxidation state in the range of from −2 to +2.

9. The method of claim 1, wherein the working electrode is selected from the group consisting of gold working electrode, platinum working electrode, copper working electrode, boron doped diamond working electrode, and glassy carbon working electrode.

10. The method of claim 9, wherein the working electrode is a gold working electrode.

11. The method of claim 1, wherein the constant potential, versus Hg/Hg$_2$SO$_4$, is selected from the range of from −2.0 to 1 V.

12. The method of claim 1, wherein the anodic oxidation current is in the range of from 1 mA/cm$^2$ to 300 mA/cm$^2$.

13. The method of claim 1, wherein step (b) is carried out for at least 100 seconds.

14. The method of claim 1, wherein step (b) is carried out for up to 6 hours.

15. The method of claim 1 wherein the metal or metal alloy plating bath is a copper or copper alloy plating bath.

16. The method of claim 1 wherein the constant potential is specifically adjusted for the reducing agent.

17. The method of claim 1 wherein the reducing agent added in step (a) is formaldehyde.

18. The method of claim 1 wherein both the one or more reducing agent and the added reducing agent are formaldehyde.

* * * * *